Patented Aug. 21, 1934

1,970,870

UNITED STATES PATENT OFFICE 1,970,870

NONMOTTLING AND NONHARDENING MAPLE SUGAR AND PROCESS OF MAKING THE SAME

Lev Skazin, Ottowa, Ontario, and John Ferguson Snell, Ste. Anne de Bellevue, Quebec, Canada No Drawing. Application March 31, 1932, Serial No. 602,404

5 Claims. (Cl. 127—59)

The present invention relates to a maple sugar which is non-mottling and which does not harden unduly with age, and to a process of producing such a maple sugar.

Maple sugar blocks now made by farmers and other maple sugar manufacturers are of quite a pleasing and uniform appearance and soft to semi-hard structure when made, but upon ageing they soon become very hard and mottled. The excessive hardness makes it very difficult to eat the sugar and to reduce it to powder form for use in the home or elsewhere. The hardening is probably mainly caused by the loss of moisture during storage or ageing. The mottling not only affects the appearance of the sugar, in producing spots or irregular patches, lighter in colour than the surrounding portions, but the uniformity of the sugar as well. The cause of mottling is, perhaps, not entirely understood, but it may be due to a segregation of sucrose crystals from the mother liquor, the former being lighter in colour than the latter. It may be due in part at least to the migration of moisture and the more soluble constituents from one place to another. Whatever the cause, mottling and the excessive hardening of present forms of maple sugar are serious obstacles in the way of their wider use.

The object of the present invention is to provide a process to overcome these objections and to provide a maple sugar which will retain its uniformity of appearance and composition, and which will not unduly harden upon standing or ageing.

Blocks of non-mottling, non-hardening maple sugar may be made from maple sap, partially concentrated maple sap, maple syrup, maple sugar or a combination of any two or more of these maple products. It is preferable that the product selected should have a relatively low content of invert sugar.

The invention will now be illustrated with particular reference to the treatment of maple syrup but it is to be understood that the same applies to any other maple sugar solution prepared by dissolving cast maple sugar, concentrating sap or otherwise.

Maple syrup is boiled in an open vessel until the desired concentration is reached, the temperature continuing to rise as evaporation takes place and the concentration increases. A suitable temperature is around 125° C. but this temperature may be varied as desired in producing a concentration adapted for the next step of the process, in which the concentrated syrup is poured into a clean, dry vessel and stirred continuously until the whole charge becomes a loose mass of maple sugar particles or crystals. During the agitation the temperature of the charge goes down until substantially room temperature is reached, and the moisture content is somewhat further reduced during this operation. The rate of stirring is decreased when turbidity, caused by crystallization, appears in the concentrated syrup. A greater fineness in the finished product may be obtained by rubbing the mass of loose particles and passing the particles through a sieve of the desired mesh. At this stage the moisture content of the maple sugar crystals is preferably about 2%.

Blocks of the sugar are now formed by molding the loose particles. The hardness of the block of sugar may be covered by the pressure applied in molding, the higher the pressure, the harder the block will be. The preferred product is obtained when the mold is such that a pound of sugar will occupy 31.4 cubic inches. If a harder product is desired, a pound of sugar must occupy 30 cubic inches or less. For example, a 1-lb. block might measure 6×3.5×1.5 inches and a ½-lb. block might measure 4.5×2.75×1.25 inches.

Maple sugar blocks prepared in this way remain free from mottling and do not harden. Wrapping in moisture-proof covering or packing in an air-tight container will preserve all the flavour.

We claim:

1. A process of making non-mottling and non-hardening maple sugar, which comprises concentrating a maple solution, continuously stirring the concentrated solution until it becomes a mass of loose sugar particles containing about 2% of moisture, and molding the mass into blocks.

2. A process as defined in claim 1, wherein the rate of stirring is reduced when turbidity appears in the solution.

3. A process of making non-mottling and non-hardening maple sugar, which comprises heating maple syrup until a temperature of about 125° C. is reached, transferring the concentrated mass to a clean, dry container, continuously stirring the mass until it becomes a mass of loose particles containing substantially 2% of moisture, the rate of stirring being decreased when turbidity appears in the mass, and pressing the particles into molds of the desired size.

4. A process as defined in claim 3, wherein the pressure applied to the molded mass is such that a 1-lb. block of sugar occupies 31.4 cubic inches.

5. A process of making non-mottling and non-hardening maple sugar which comprises preparing maple sugar in granular form containing substantially 2% of moisture and molding the latter under pressure into blocks.

LEV SKAZIN.
JOHN FERGUSON SNELL.